United States Patent Office 2,965,554
Patented Dec. 20, 1960

2,965,554

PRODUCTION OF POLYPEPTIDES AND AMINO ACIDS AND CARBOHYDRATES

Eric Ellenbogen, Pittsburgh, Pa., assignor to Lasdon Foundation, Inc., Yonkers, N.Y., a corporation of Delaware No Drawing. Filed Jan. 28, 1959, Ser. No. 789,509

13 Claims. (Cl. 204—162)

This invention relates to the production of peptides and amino acids, and more particularly to processes for photochemically synthesizing polypeptides and amino acids.

In accordance with this invention, polypeptides and amino acids are synthesized by reacting a lower hydrocarbon in the gaseous phase with an aqueous solution of (1) an inorganic ammonium salt soluble or sparingly soluble in water, (2) ammonium hydroxide, or (3) an alkali metal nitrate in the presence of a catalyst for the reaction while maintaining the reaction mixture at a temperature of from about 15° C. to about 95° C. and while subjecting the solution to irradiation. A polypeptide precipitate results which can be hydrolyzed to produce amino acids.

In carrying out the reaction, all inorganic salts containing the ammonium ion, soluble or sparingly soluble in water, can be used as one of the reactants. Examples of such salts are ammonium bicarbonate, ammonium carbonate, ammonium chloride, ammonium nitrate, ammonium phosphates including the mono-basic, di-basic and meta phosphates, ammonium sulfate, ammonium chlorates, ammonium selenates, etc. Ammonium hydroxide and the alkali metal nitrates, namely, sodium, potassium and lithium nitrate, can also be used in the process. In all cases these salts and ammonium hydroxide are dissolved in water to form the aqueous solution reactant. The concentration of inorganic ammonium salt, ammonium hydroxide or alkali metal nitrate in the aqueous solutions can be between 0.05 molar to a completely saturated solution. Preferably the concentration of salts enumerated above is within the range of from 0.3 to 1.5 molar.

As the catalyst, ferrous sulfide, ferrous oxide, sodium chloride, potassium chloride, potassium phosphate, sodium phosphate, calcium oxide, calcium phosphate, ferrous mangano-phosphate, talc, magnesium silicate and the oxides of the heavy metals of groups 2B, 4B, 5B, 7B and 8 of the periodic table as well as iron-nickel alloys can be employed. Mixtures of the above enumerated catalysts may be used.

The catalyst concentration is within the range of from 100 mg. of catalyst per mole of salt or amomnium hydroxide to about 10% of the number of mols of salt or ammonium hydroxide in the solution. Preferably the catalyst concentration is from 50 to 250 mg. of catalyst per 100 milliliters of salt solution.

The lower hydrocarbon gas reacted with the aqueous solution of salt or ammonium hydroxide is a hydrocarbon gas containing from 1 to 5 carbon atoms, such, for example, as methane, ethane, propane, butane, or mixtures thereof. Illuminating gas or natural gas containing approximately 90.7% methane, 7.6% ethane, 0.3% propane, and higher hydrocarbons, the rest being oxygen, nitrogen and carbon dioxide, can be used effectively as the lower hydrocarbon gas reactant. Pure methane, ethane, propane and mixtures thereof can be employed; such hydrocarbons or mixtures thereof may contain carbon monoxide, carbon dioxide, hydrogen, oxygen, nitrogen and mixtures of such additional gases.

The amount of hydrocarbon gas used is that required to react with the nitrogen present in the reaction mixture to precipitate polypeptides. From 3.5 to 14 grams of natural gas per 100 milliliters of salt solution have given appreciable yields of polypeptides.

The reaction is carried out by irradiating the reaction mixture containing the solution of the ammonium salt, ammonium hydroxide or alkali metal nitrate and the catalyst maintained at a temperature of from 15° C. to 95° C., employing any light source having a broad spectrum and including ultraviolet radiation, such, for example, as hydrogen lamps, mercury arc lamps, carbon arc lamps, solar light, noble gas lamps, Nernst glowers, spark discharges, underwater sparks, etc. The irradiation may be produced from a source external to the reaction mixture and the light rays passed through the reaction mixture contained, for example, in a fused silica or other reactor capable of transmitting light, or by producing the irradiation within the reaction mixture. For example, a lamp producing the light rays may be placed within the reaction mixture, or spark discharges or underwater sparks may be produced in the reaction mixture.

In practicing the process, the aqueous salt solution or solution of ammonium hydroxide is placed in a suitable reactor which may be fused silica, quartz or other suitable reactor equipped with an inlet for introducing the hydrocarbon gas thereinto and suitable cooling means such as a fan to maintain the reaction mixture at the desired temperature. The catalyst is introduced, the reaction mixture subjected to irradiation as above described, and the hydrocarbon gas introduced gradually as the reaction proceeds, for exmaple, by being bubbled into the reaction mixture. The hydrocarbon gas may be recycled through the reaction mixture, i.e., the gas passed through the reaction mixture, unreacted gas being withdrawn and recycled through the reaction mixture.

While it is preferred to carry out the reaction under atmospheric pressure conditions, the reaction may be carried out under superatmospheric pressures as high as 100 atmospheres. Operating under atmospheric pressure conditions, it is preferred to maintain the temperature within the range of 25° C. to 75° C.

Surprisingly it has been found that a reaction between the hydrocarbon gas and the aqueous salt solution or aqueous solution of ammonium hydroxide takes place to precipitate polypeptides and carbohydrate complexes which can be hydrolyzed for example, in known manner by reaction with dilute acids such as hydrochloric acid (from 1 Normal to 6 Normal) to form amino acids. Hydrolysis of the polypeptides may also be effected by treatment with $H_2SO_4$ (from 1 to 10 Normal) or alkali metal or alkaline earth metal hydroxides e.g. sodium or potassium hydroxide or barium hydroxide. These amino acids can be isolated or purified by known techniques, such as fractional crystallization, or fractional elution from absorbing columns.

The following examples illustrate preferred embodiments of the invention. It will be understood that this invention is not limited to these examples.

*Example 1*

75 ml. of 1 molar solution of ammonium chloride and 25 mg. of ferrous sulfide were placed into a fused silica flask and natural gas passed through the reaction mixture at a rate of 10 ml. per minute. A stream of air was passed over this flask by means of a fan to maintain its temperature between 30° C. and 45° C. The flask was irradiated by a mercury vapor lamp. At the end of eight hours, a precipitate formed. This precipitate was separated from the reaction mixture and consisted of a polypeptide composed of phenylalanine, valine, leucine and methionine. This precipitate upon hydrolysis by heating with a dilute (10%) acid (HCl) yields the amino acids enumerated.

*Example II*

75 ml. of 1.0 molar solution of ammonium chloride was illuminated by a mercury arc lamp in a fused silica flask containing 25 mg. ferrous sulfide. Natural gas was passed through this solution at a rate of 3 ml. per minute at a temperature of 30° C. A precipitate begins to form after one day. The reaction was continued for five days; thereafter the accumulated polypeptide precipitate was filtered off, washed and dried, yielding a total of 30 mg. of precipitate. When hydrolyzed with 6 N hydrochloric acid while refluxing for 16 hours, the hydrolysate contained methionine, phenylalanine and valine.

*Example III*

75 ml. of 1.0 molar solution of ammonium bicarbonate was irradiated as in Example II. This solution contained 35 mg. of ferrous sulfide as catalyst. Natural gas was passed through this solution at a rate of 6 ml. per minute. The temperature was kept at 40° C. A precipitate formed after 12 hours. At the end of five days the precipitated polypeptide was removed by filtration and upon hydrolysis was found to contain phenylalanine, valine, cystine, aspartic acid, alanine, glutamic acid and leucine.

*Example IV*

75 ml. of 1.0 molar solution of ammonium bicarbonate was irradiated as in Example II. This solution contained 35 mg. of ferrous sulfide as catalyst. 6 ml. per minute of natural gas and from 1 to 10 ml. per minute of carbon dioxide were passed through this solution. The temperature was kept at 40° C. A precipitate formed after 12 hours. At the end of five days the precipitated polypeptide was removed by filtration and upon hydrolysis was found to contain phenylalanine, valine, cystine, aspartic acid, alanine, glutamic acid and leucine.

*Example V*

75 ml. of 1.0 molar solution of ammonium bicarbonate was irradiated as in Example II. This solution contained 35 mg. of ferrous sulfide as catalyst. 6 ml. per minute of natural gas and 16 ml. per minute of nitrogen were passed through this solution. The temperature was kept at 40° C. A precipitate formed after 12 hours. At the end of five days the precipitated polypeptide was removed by filtration and upon hydrolysis was found to contain phenylalanine, valine, cystine, aspartic acid, alanine, glutamic acid and leucine.

*Example VI*

75 ml. of 1.0 molar solution of ammonium bicarbonate was irradiated as in Example II. This solution contained 35 mg. of ferrous sulfide as catalyst. 6 ml. per minute of natural gas, 16 ml. per minute of nitrogen and 5 ml. per minute of carbon dioxide were passed through this solution. The temperature was kept at 40° C. A precipitate formed after 12 hours. At the end of five days the precipitated polypeptide was removed by filtration and upon hydrolysis was found to contain phenylalanine, valine, cystine, aspartic acid, alanine, glutamic acid and leucine.

*Example VII*

75 ml. of an 0.8 molar solution of sodium nitrate containing 35 mg. of ferrous sulfide was irradiated as in Example II. After seven days the precipitated polypeptide was separated from the solution by filtration and hydrolyzed. It contained glycine, with traces of other amino acids and an organic amine.

*Example VIII*

90 ml. of a 1.1 molar solution of ammonium bicarbonate in the presence of a catalyst consisting of a mixture of 20 mg. of ferrous sulfide, 50 mg. calcium oxide, 30 mg. dipotassium phosphate and 20 mg. sodium chloride was irradiated while passing natural gas therethrough, employing a carbon arc lamp as the source of light. The temperature was maintained at 65° C. during the first four hours of the reaction, at the end of which time a polypeptide precipitate began to form. The temperature was lowered by external cooling to 40° C. and the reaction continued for six days. During this time a total of 14 grams of natural gas was passed through the solution. The accumulated polypeptide precipitate was separated from the reaction mixture. The polypeptide precipitate was hydrolyzed with dilute hydrochloric acid and was found to contain alanine, glycine, threonine, serine, glutamic acid, aspartic acid, methionine, phenylalanine and leucine. The aqueous phase was found to contain alanine, purine and pyrimidine phosphates.

*Example IX*

90 ml. of a 1.1 molar solution of ammonium chloride in the presence of a catalyst consisting of 15 mg. ferrous mangano phosphate was irradiated while passing natural gas therethrough, employing a carbon arc lamp as the source of light. The temperature was maintained at 65° C. during the first four hours of the reaction, at the end of which time a polypeptide precipitate began to form. The temperature was lowered by external cooling to 40° C. and the reaction continued for six days. During this time a total of 14 grams of natural gas was passed through the solution. The accumulated polypeptide precipitate was separated from the reaction mixture. The polypeptide precipitate was hydrolyzed with dilute hydrochloric acid and was found to contain alanine, glycine, threonine, serine, glutamic acid, aspartic acid, methionine, phenylalanine and leucine. The aqueous phase was found to contain purine and pyrimidine phosphates.

*Example X*

90 ml. of a 1.1 molar solution of ammonium bicarbonate in the presence of a catalyst consisting of a mixture of 20 mg. of ferrous sulfide, 50 mg. calcium oxide, 30 mg. dipotassium phosphate and 20 mg. sodium chloride was irradiated employing a mercury arc lamp as the source of light while passing through the catalyst containing solution a mixture of natural gas, 1 ml. per minute of carbon dioxide, 4 ml. per hour of hydrogen, 8 ml. per minute of carbon monoxide and 4 ml. per hour of oxygen. The temperature was maintained at 65° C. during the first four hours of the reaction, at the end of which time a polypeptide precipitate began to form. The temperature was lowered by external cooling to 40° C. and the reaction continued for six days. During this time a total of 14 grams of natural gas was passed through the solution. The accumulated polypeptide precipitate was separated from the reaction mixture. The polypeptide precipitate was hydrolyzed with dilute hydrochloric acid and was found to contain alanine, glycine, threonine, serine, glutamic acid, aspartic acid, methionine, phenylalanine and leucine. The aqueous phase was found to contain purine and pyrimidine phosphates, as well as carbohydrates.

*Example XI*

90 ml. of a 1.1 molar solution of ammonium bicarbonate in the presence of a catalyst consisting of a mixture of 20 mg. of ferrous sulfide, 50 mg. calcium oxide, 30 mg. dipotassium phosphate and 20 mg. sodium chloride was irradiated employing a carbon arc lamp as the source of light while passing through the catalyst containing solution a mixture of natural gas and carbon dioxide. The temperature was maintained at 65° C. during the first four hours of the reaction, at the end of which time a complex precipitate begain to form. The temperature was lowered by external cooling to 40° C. and the reaction continued for six days. During this time 1 ml. per minute of carbon dioxide and 14 grams of natural gas were passed through the catalyst containing solution. The accumulated complex precipitate was separated from the reaction mixture. The complex precipitate was hydrolyzed with dilute hydrochloric acid and was found to contain alanine, glycine, threonine, serine, glutamic acid, aspartic acid, methionine, phenylalanine, cystine, valine, glucose and a di-ketone. The aqueous phase was found to contain glycine, purine, pyrimidine phosphates, and oxaloacetic acid.

*Example XII*

90 ml. of a 1.1 molar solution of ammonium bicarbonate in the presence of a catalyst consisting of a mixture of 20 mg. of ferrous sulfide, 50 mg. calcium oxide, 30 mg. dipotassium phosphate, 20 mg. sodium chloride and 10 mg. natural talc was irradiated employing a mercury arc lamp as the source of light while passing through the catalyst containing solution a mixture of natural gas and carbon monoxide. The temperature was maintained at 65° C. during the first four hours of the reaction, at the end of which time a complex precipitate began to form. The temperature was lowered by external cooling to 40° C. and the reaction continued for six days. During this time 8 ml. per minute of carbon monoxide and a total of 14 grams of natural gas were passed through the catalyst containing solution. The accumulated precipitate was separated from the reaction mixture. An aliquot of the precipitate was hydrolyzed under reflux with dilute hydrochloric acid and was found to contain alanine, glycine, threonine, serine, glutamic acid, aspartic acid, methionine, phenylalanine, isoleucine and leucine. Another aliquot of the precipitate was hydrolyzed at room temperature with dilute hydrochloric acid for two days. It contained glucose and a keto acid. The aqueous phase was found to contain purine, pyrimidine phosphates and glucose.

*Example XIII*

90 ml. of a 0.5 molar solution of ammonium chloride in the presence of a catalyst consisting of a mixture of 20 mg. of ferrous sulfide, 50 mg. calcium oxide, 30 mg. di-ammonium phosphate, 20 mg. potassium chloride and 10 mg. magnesium trisilicate was irradiated employing a mercury arc lamp as the source of light while passing through the catalyst containing solution a mixture of natural gas and hydrogen. The temperature was maintained at 65° C. during the first four hours of the reaction, at the end of which time a polypeptide began to form. The temperature was lowered by external cooling to 40° C. and the reaction continued for six days. During this time 4 ml. per hour of hydrogen and 14 grams of natural gas were passed through the catalyst containing solution. The accumulated polpeptide precipitate was separated from the reaction mixture. The polypeptide precipitate was hydrolyzed with dilute hydrochloric acid and was found to contain alanine, glycine, threonine, serine, glutamic acid, aspartic acid, methionine, phenylalanine and leucine.

*Example XIV*

90 ml. of a 1.1 molar solution of ammonium chloride in the presence of a catalyst consisting of a mixture of 20 mg. of ferrous sulfide, 10 mg. calcium oxide, 30 mg. dipotassium phosphate and 15 mg. magnesium trisilicate was irradiated employing a mercury arc lamp as the source of light while passing through the catalyst containing solution a mixture of natural gas, carbon monoxide and oxygen. The temperature was maintained at 65° C. during the first four hours of the reaction, at the end of which time a complex precipitate began to form. The temperature was lowered by external cooling to 40° C. and the reaction continued for six days. During this time 4 ml. per hour of oxygen, 4 ml. per hour of carbon dioxide and 14 grams of natural gas were passed through the catalyst containing solution. The accumulated precipitate was separated from the reaction mixture. The precipitate was hydrolyzed with dilute hydrochloric acid and was found to contain alanine, glycine, threonine, serine, glutamic acid, aspartic acid, methionine, phenylalanine and leucine, and carbohydrates. The aqueous phase was found to contain glycine, alanine, purine and pyrimidine phosphates, di-imides, and carbohydrates.

*Example XV*

90 ml. of a 1.1 molar solution of ammonium bicarbonate in the presence of a catalyst consisting of a mixture of 20 mg. of ferrous sulfide, 50 mg. calcium oxide, 30 mg. dipotassium phosphate and 20 mg. sodium chloride was irradiated employing a carbon arc lamp as the source of light while passing through the catalyst containing solution a mixture of natural gas, carbon dioxide and nitrogen. The temperature was maintained at 65° C. during the first four hours of the reaction, at the end of which time a precipitate began to form. The temperature was lowered by external cooling to 40° C. and the reaction continued for six days. During this time 1 ml. per minute of carbon dioxide, and 4 ml. per hour of nitrogen and 14 grams of natural gas were passed through the catalyst containing solution. The accumulated precipitate was separated from the reaction mixture. The precipitate was hydrolyzed with dilute hydrochloric acid and was found to contain alanine, cystine, glycine, threonine, serine, glutamic acid, aspartic acid, methionine, phenylalanine, leucine, and carbohydrates including glucose and glyceric acid. The aqueous phase was found to contain glycine, purine, pyrimidine phosphates, formaldehyde and lactic acid.

*Example XVI*

Example VIII was repeated, substituting 0.5 molar ammonium hydroxide for the ammonium bicarbonate. The yields were substantially identical.

*Example XVII*

Example VIII was repeated, substituting 0.5 molar ammonium hydroxide for the ammonium bicarbonate and using 20 mg. di-ammonium phosphate as the catalyst. The yields were substantially the same.

It will be understood that the present invention is not to be limited to the above disclosure otherwise than as defined by the appended claims.

What is claimed is:

1. A process of producing polypeptides which comprises passing a saturated hydrocarbon containing from 1 to 5 carbon atoms in the gaseous phase into an aqueous solution of a compound from the group consisting of inorganic ammonium salts, ammonium hydroxide and alkali metal nitrates, said solution containing, in amount sufficient to catalyze the reaction, a catalyst from the group consisting of ferrous sulfide, ferrous oxide, sodium chloride, potassium chloride, potassium phosphate, sodium phosphate, calcium oxide, calcium phosphate, ferrous mangano phosphate, talc, magnesium silicate, iron-nickel alloys, and the oxides of the heavy metals of groups 2B, 4B, 5B, 6B, 7B and 8 of the periodic table, while maintaining said solution at a temperature within the range of from 15° C. to 95° C. and while subjecting said solution to ultraviolet irradiation.

2. The process as defined in claim 1, in which the hydrocarbon gas is natural gas and there is admixed with the natural gas, a gas from the group consisting of carbon dioxide, carbon monoxide, hydrogen, nitrogen, oxygen and mixtures of said gases.

3. The process as defined in claim 1, in which the concentration of the compound from the group consisting of ammonium salts and ammonium hydroxide in the aqueous solution is between 0.05 molar to complete saturation of the solution and the concentration of the catalyst is within the range of 100 mg. catalyst per mol of said compound to about 10% of the number of mols of said compound in the solution.

4. The process as defined in claim 1, in which the reaction is carried out at atmospheric pressure and a temperature within the range of 25° C. to 75° C.

5. The process as defined in claim 1, in which the hydrocarbon gas is passed continuously through said aqueous solution during the course of the reaction, the reaction is carried out under atmospheric pressure, and the temperature of the reaction is maintained within the range of 25° C. to 75° C.

6. The process of producing polypeptides composed of phenylalanine, valine, leucine and methionine, which comprises passing natural gas through an aqueous solution of ammonium chloride containing ferrous sulfide in amount sufficient to catalyze the reaction, while maintaining the reaction mixture at a temperature of from 30° C. to 45° C., and subjecting the reaction mixture to ultraviolet irradiation, continuing the flow of natural gas through this reaction mixture until a precipitate forms, and separating the precipitate from the reaction mixture.

7. The process as defined in claim 6, in which the precipitate is hydrolyzed to produce amino acids.

8. The process of producing a polypeptide containing phenylalanine, valine, cystine, aspartic acid, alanine, glutamic acid and leucine, which comprises passing natural gas through an aqueous solution of ammonium bicarbonate at a temperature within the range of 25° C. to 75° C., while subjecting said solution to ultraviolet irradiation said solution containing ferrous sulfide in amount sufficient to catalyze the reaction, the flow of natural gas through said solution being continued until a precipitate of said polypeptide forms, and separating said precipitate from the aqueous solution.

9. The process of producing a polypeptide containing glycine, which comprises passing natural gas through an aqueous solution of sodium nitrate containing ferrous sulfide in amount sufficient to catalyze the reaction, while subjecting said solution to ultraviolet irradiation, maintaining the mixture at a temperature within the range of 25° C. to 75° C., to produce a polypeptide precipitate containing glycine and separating said precipitate from the aqueous solution.

10. The process of producing a polypeptide containing alanine, glycine, threonine, serine, glutamic acid, aspartic acid, methionine, phenylalanine and leucine, which comprises passing natural gas through a solution of ammonium bicarbonate containing a catalytic amount of a mixture of ferrous sulfide, calcium oxide, potassium phosphate and sodium chloride, while subjecting the reaction mixture to ultraviolet irradiation and while maintaining the reaction mixture at a temperature of 65° C. until a polypeptide precipitate begins to form, thereafter lowering the temperature to about 40° C. and continuing the reaction, and separating the polypeptide precipitate thus produce from the aqueous solution.

11. A process of producing polypeptides which comprises reacting a saturated hydrocarbon gas containing from 1 to 5 carbon atoms with an aqueous solution of a compound from the group consisting of inorganic ammonium salts, ammonium hydroxide, and alkali metal nitrates in the presence of diammonium phosphate in amount sufficient to catalyze the reaction, while maintaining said solution at a temperature within the range of from 15° C. to 95° C. and while subjecting said solution to ultraviolet irradiation.

12. A process of producing polypeptides which comprises reacting a saturated hydrocarbon gas containing from 1 to 5 carbon atoms with an aqueous solution of a compound from the group consisting of inorganic ammonium salts, ammonium hydroxide, and alkali metal nitrates in the presence of ferrous mangano phosphate in amount sufficient to catalyze the reaction, while maintaining said solution at a temperature within the range of from 15° C. to 95° C. and while subjecting said solution to ultraviolet irradiation.

13. A process of producing polypeptides which comprises reacting a saturated hydrocarbon gas containing from 1 to 5 carbon atoms with an aqueous solution of a compound from the group consisting of inorganic ammonium salts, ammonium hydroxide, and alkali metal nitrates in the presence of ferric phosphate in amount sufficient to catalyze the reaction, while maintaining said solution at a temperature within the range of from 15° C to 95° C., and while subjecting said solution to ultraviolet irradiation.

References Cited in the file of this patent

UNITED STATES PATENTS 2,515,515    Kahn _____ July 18, 1950